(12) United States Patent
Smith (10) Patent No.: US 10,766,133 B2
(45) Date of Patent: Sep. 8, 2020

(54) LEGGED ROBOTIC DEVICE UTILIZING MODIFIABLE LINKAGE MECHANISM

(71) Applicant: Sarcos LC, Salt Lake City, UT (US)

(72) Inventor: Fraser M. Smith, Salt Lake City, UT (US)

(73) Assignee: Sarcos LC, Salt Lake City, UT (US)

( * ) Notice: Subject to any disclaimer, the term of this patent is extended or adjusted under 35 U.S.C. 154(b) by 1033 days.

(21) Appl. No.: 14/704,925

(22) Filed: May 5, 2015

(65) Prior Publication Data

US 2015/0321340 A1 Nov. 12, 2015

Related U.S. Application Data

(60) Provisional application No. 61/989,513, filed on May 6, 2014.

(51) Int. Cl.
*B25J 9/00* (2006.01)
*B25J 9/10* (2006.01)
(Continued)

(52) U.S. Cl.
CPC ............ *B25J 9/0006* (2013.01); *A61H 1/024* (2013.01); *A61H 1/0244* (2013.01);
(Continued)

(58) Field of Classification Search
CPC ...... A61H 1/0237–0244; A61H 1/0262; A61H 2001/0211; A61H 2003/001; A61H 2003/007; A61H 3/00; B25J 9/0006
See application file for complete search history.

(56) References Cited

U.S. PATENT DOCUMENTS

| | | |
|---|---|---|
| 1,880,138 A | 9/1932 | Franz |
| 2,850,189 A | 9/1958 | Leroy |

(Continued)

FOREIGN PATENT DOCUMENTS

| | | |
|---|---|---|
| CN | 101214653 A | 7/2008 |
| CN | 103610524 A | 3/2014 |

(Continued)

OTHER PUBLICATIONS

Grabowski et al., Exoskeletons for Running and Hopping Augmentation, Journal of Applied Physiology, http://biomech.media.mit.edu/portfolio_page/load-bearing-exoskeleton-for-augmentation-of-human-running/, 2009, 4 pages, vol. 107, No. 3, American Physiological Society, United States.

(Continued)

*Primary Examiner* — Valerie L Woodward (57) ABSTRACT

A legged robotic device is disclosed. The legged robotic device can include a mechanism formed at least in part by a plurality of support members coupled together for relative movement defining a plurality of degrees of freedom, at least some of the plurality of degrees of freedom corresponding to degrees of freedom of a human leg. The legged robotic device can also include a primary drive actuator operable to apply a force or a torque to the support members in a first of the plurality of degrees of freedom. In addition, the legged robotic device can include a second actuator operable to apply a force or a torque to the support members in a second of the plurality of degrees of freedom. The mechanism can be configured to move in a gait-like motion that emulates human gait. The primary drive actuator can be sufficient to actuate the mechanism to move the mechanism in the gait-like motion. The mechanism can be dynamically modified by actuating the second actuator.

33 Claims, 3 Drawing Sheets

(51) Int. Cl.
*B25J 9/02* (2006.01)
*A61H 1/02* (2006.01)
*A61H 3/00* (2006.01)

(52) U.S. Cl.
CPC .............. *A61H 1/0266* (2013.01); *A61H 3/00* (2013.01); *B25J 9/02* (2013.01); *B25J 9/10* (2013.01); *A61H 2201/0165* (2013.01); *A61H 2201/1215* (2013.01); *A61H 2201/1238* (2013.01); *A61H 2201/1436* (2013.01); *A61H 2201/164* (2013.01); *A61H 2201/165* (2013.01); *A61H 2201/1628* (2013.01); *A61H 2201/5058* (2013.01); *A61H 2201/5061* (2013.01); *Y10T 74/20305* (2015.01)

(56) References Cited

U.S. PATENT DOCUMENTS

| | | |
|---|---|---|
| 2,981,198 A | 4/1961 | Nettel |
| 3,171,549 A | 3/1965 | Orloff |
| 3,280,991 A | 10/1966 | Melton et al. |
| 3,306,646 A | 2/1967 | Flora, Jr. |
| 3,358,678 A | 12/1967 | Kulstar |
| 3,449,008 A | 6/1969 | Colechia |
| 3,449,769 A | 6/1969 | Mizen |
| 3,535,711 A | 10/1970 | Fick |
| 3,759,563 A | 9/1973 | Kitamura |
| 4,046,262 A | 9/1977 | Vykukal et al. |
| 4,179,233 A | 12/1979 | Bromell et al. |
| 4,200,596 A | 4/1980 | Iiyama et al. |
| 4,251,791 A | 2/1981 | Yanagisawa et al. |
| 4,398,110 A | 8/1983 | Flinchbaugh et al. |
| 4,483,407 A | 11/1984 | Iwamoto et al. |
| 4,567,417 A | 1/1986 | Francois et al. |
| 4,575,297 A | 3/1986 | Richter |
| 4,591,944 A | 5/1986 | Gravel |
| 4,603,896 A | 8/1986 | Vasseur et al. |
| 4,661,032 A | 4/1987 | Arai |
| 4,666,357 A | 5/1987 | Babbi |
| 4,723,353 A | 2/1988 | Monforte |
| 4,762,455 A | 8/1988 | Coughlan et al. |
| 4,768,143 A | 8/1988 | Lane et al. |
| 4,821,594 A | 4/1989 | Rosheim et al. |
| 4,834,443 A | 5/1989 | Crowder et al. |
| 4,853,874 A | 8/1989 | Iwamoto et al. |
| 4,883,400 A | 11/1989 | Kuban et al. |
| 4,884,720 A | 12/1989 | Whigham et al. |
| 4,915,437 A | 4/1990 | Cherry |
| 4,921,292 A | 5/1990 | Harwell et al. |
| 4,997,095 A | 3/1991 | Jones et al. |
| 5,004,391 A | 4/1991 | Burdea |
| 5,038,089 A | 8/1991 | Szakaly |
| 5,072,361 A | 12/1991 | Davis et al. |
| 5,080,682 A | 1/1992 | Schectman |
| 5,101,472 A | 3/1992 | Repperger |
| 5,105,367 A | 4/1992 | Tsuchihashi et al. |
| 5,117,814 A | 6/1992 | Luttrell et al. |
| 5,144,943 A | 9/1992 | Luttrell et al. |
| 5,172,951 A | 12/1992 | Jacobsen et al. |
| 5,230,147 A | 7/1993 | Asaoka et al. |
| 5,239,246 A | 8/1993 | Kim |
| 5,246,216 A | 9/1993 | Oberst |
| 5,280,981 A | 1/1994 | Schulz |
| 5,282,460 A | 2/1994 | Boldt |
| 5,328,224 A | 7/1994 | Jacobsen et al. |
| 5,336,982 A | 8/1994 | Backes |
| 5,389,849 A | 2/1995 | Asano et al. |
| 5,399,951 A | 3/1995 | Lavallee et al. |
| 5,516,249 A | 5/1996 | Brimhall |
| 5,577,417 A | 11/1996 | Fournier |
| 5,577,902 A | 11/1996 | Todo et al. |
| 5,588,688 A | 12/1996 | Jacobsen et al. |
| 5,664,636 A | 9/1997 | Ikuma et al. |
| 5,704,945 A | 1/1998 | Wagner et al. |
| 5,762,390 A | 6/1998 | Gosselin et al. |
| 5,784,542 A | 7/1998 | Ohm et al. |
| 5,785,505 A | 7/1998 | Price |
| 5,797,615 A | 8/1998 | Murray |
| 5,845,540 A | 12/1998 | Rosheim |
| 5,865,770 A | 2/1999 | Schectman |
| 5,898,599 A | 4/1999 | Massie et al. |
| 5,912,658 A | 6/1999 | Bergamasco et al. |
| 5,949,686 A | 9/1999 | Yoshinada et al. |
| 5,957,981 A | 9/1999 | Gramnas |
| 5,961,476 A | 10/1999 | Betto et al. |
| 5,967,580 A | 10/1999 | Rosheim |
| 5,994,864 A | 11/1999 | Inoue et al. |
| 6,016,385 A | 1/2000 | Yee et al. |
| 6,170,162 B1 | 1/2001 | Jacobsen et al. |
| 6,202,013 B1 | 3/2001 | Anderson et al. |
| 6,272,924 B1 | 8/2001 | Jansen |
| 6,301,526 B1 | 10/2001 | Kim et al. |
| 6,338,605 B1 | 1/2002 | Halverson et al. |
| 6,340,065 B1 | 1/2002 | Harris |
| 6,360,166 B1 | 3/2002 | Alster |
| 6,394,731 B1 | 5/2002 | Konosu et al. |
| 6,425,865 B1 | 7/2002 | Salcudean et al. |
| 6,430,473 B1 | 8/2002 | Lee et al. |
| 6,435,794 B1 | 8/2002 | Springer |
| 6,507,163 B1 | 1/2003 | Allen |
| 6,508,058 B1 | 1/2003 | Seaverson |
| 6,554,342 B1 | 4/2003 | Burnett |
| 6,641,371 B2 | 11/2003 | Graziani et al. |
| 6,659,703 B1 | 12/2003 | Kirkley |
| 6,659,939 B2 | 12/2003 | Moll et al. |
| 6,663,154 B2 | 12/2003 | Pancheri |
| 6,714,839 B2 | 3/2004 | Salisbury, Jr. et al. |
| 6,740,125 B2 | 5/2004 | Mosler |
| 6,855,170 B2 | 2/2005 | Gramnas |
| 7,168,748 B2 | 1/2007 | Townsend et al. |
| 7,396,057 B2 | 7/2008 | Ye et al. |
| 7,405,531 B2 | 7/2008 | Khatib et al. |
| 7,409,882 B2 | 8/2008 | Massimo et al. |
| 7,410,338 B2 | 8/2008 | Schiele et al. |
| 7,509,905 B2 | 3/2009 | Jacobsen et al. |
| 7,628,766 B1 | 12/2009 | Kazerooni et al. |
| 7,783,384 B2 | 8/2010 | Kraft |
| 7,862,522 B1 | 1/2011 | Barclay et al. |
| 7,862,524 B2 | 1/2011 | Carignan et al. |
| 7,883,546 B2 | 2/2011 | Kazerooni et al. |
| 7,947,004 B2 | 5/2011 | Kazerooni et al. |
| 7,965,006 B2 | 6/2011 | Kang et al. |
| 8,024,071 B2 | 9/2011 | Komatsu et al. |
| 8,051,764 B2 | 11/2011 | Jacobsen et al. |
| 8,100,451 B2 | 1/2012 | Okuda et al. |
| 8,132,835 B2 | 3/2012 | Ban et al. |
| 8,151,401 B2 | 4/2012 | Cheyne |
| 8,182,010 B2 | 5/2012 | Lee et al. |
| 8,245,728 B2 | 8/2012 | Jacobsen et al. |
| 8,295,975 B2 | 10/2012 | Arimatsu et al. |
| 8,375,982 B2 | 2/2013 | Gray, Jr. |
| 8,435,309 B2 | 5/2013 | Gilbert et al. |
| 8,452,447 B2 | 5/2013 | Nixon |
| 8,473,101 B2 | 6/2013 | Summer |
| 8,511,192 B2 | 8/2013 | Hirtt et al. |
| 8,516,918 B2 | 8/2013 | Jacobsen et al. |
| 8,529,582 B2 | 9/2013 | Devengenzo et al. |
| 8,560,118 B2 | 10/2013 | Greer et al. |
| 8,640,723 B2 | 2/2014 | Jacobsen et al. |
| 8,667,643 B2 | 3/2014 | Simonelli et al. |
| 8,672,378 B2 | 3/2014 | Yamasaki et al. |
| 8,747,486 B2 | 6/2014 | Kawasaki et al. |
| 8,794,262 B2 | 8/2014 | Jacobsen et al. |
| 8,821,338 B2 | 9/2014 | Thorson |
| 8,849,457 B2 | 9/2014 | Jacobsen et al. |
| 8,870,967 B2 | 10/2014 | Herr et al. |
| 8,881,616 B2 | 11/2014 | Dize et al. |
| 8,888,864 B2 | 11/2014 | Iverson et al. |
| 8,892,258 B2 | 11/2014 | Jacobsen et al. |
| 8,920,517 B2 | 12/2014 | Smith et al. |
| 8,942,846 B2 | 1/2015 | Jacobsen et al. |
| 8,977,388 B2 | 3/2015 | Jacobsen et al. |
| 8,977,398 B2 | 3/2015 | Jacobsen et al. |
| 9,295,604 B2 | 3/2016 | Zoss et al. |

(56) References Cited

U.S. PATENT DOCUMENTS

| | | |
|---|---|---|
| 9,314,921 B2 | 4/2016 | Jacobsen et al. |
| 9,329,587 B2 | 5/2016 | Fudaba et al. |
| 9,333,097 B2 | 5/2016 | Herr et al. |
| 9,533,411 B2 | 1/2017 | Jacobsen et al. |
| 9,616,580 B2 | 4/2017 | Smith et al. |
| 9,643,323 B2 | 5/2017 | Nagatsuka et al. |
| 9,727,076 B2 | 8/2017 | Smith et al. |
| 9,789,603 B2 | 10/2017 | Jacobsen et al. |
| 9,895,812 B2 | 2/2018 | Gonzalez et al. |
| 10,028,844 B2 | 7/2018 | Cheng et al. |
| 10,216,177 B2 | 2/2019 | Gildert et al. |
| 10,406,676 B2 | 9/2019 | Smith et al. |
| 10,512,583 B2 | 12/2019 | Smith |
| 10,533,542 B2 | 1/2020 | Smith et al. |
| 10,566,914 B2 | 2/2020 | Fujita et al. |
| 2001/0033146 A1 | 10/2001 | Kato et al. |
| 2001/0043847 A1 | 11/2001 | Kramer |
| 2002/0075233 A1 | 6/2002 | White et al. |
| 2002/0094919 A1 | 7/2002 | Rennex et al. |
| 2003/0005896 A1 | 1/2003 | Jacobsen et al. |
| 2003/0146720 A1 | 8/2003 | Riwan et al. |
| 2003/0152452 A1 | 8/2003 | Hodgson |
| 2003/0223844 A1 | 12/2003 | Schiele et al. |
| 2004/0004362 A1 | 1/2004 | Love |
| 2004/0037681 A1 | 2/2004 | Marcotte |
| 2004/0102723 A1 | 5/2004 | Horst |
| 2004/0106881 A1 | 6/2004 | McBean et al. |
| 2004/0116836 A1 | 6/2004 | Kawai et al. |
| 2004/0246769 A1 | 12/2004 | Ido |
| 2004/0250644 A1 | 12/2004 | Gosselin et al. |
| 2005/0059908 A1 | 3/2005 | Bogert |
| 2005/0099386 A1 | 5/2005 | Kukita |
| 2005/0159850 A1 | 7/2005 | Melman |
| 2005/0166413 A1 | 8/2005 | Crampton |
| 2005/0193451 A1 | 9/2005 | Quistgaard et al. |
| 2005/0251110 A1 | 11/2005 | Nixon |
| 2006/0052732 A1 | 3/2006 | Shimada et al. |
| 2006/0064047 A1* | 3/2006 | Shimada ............... A61F 5/0102 602/23 |
| 2006/0069449 A1 | 3/2006 | Bisbee, III et al. |
| 2006/0130594 A1 | 6/2006 | Ikeuchi |
| 2006/0149419 A1 | 7/2006 | Ogawa et al. |
| 2006/0184275 A1 | 8/2006 | Hosokawa et al. |
| 2006/0197049 A1 | 9/2006 | Hamada et al. |
| 2006/0245897 A1 | 11/2006 | Hariki et al. |
| 2006/0249315 A1 | 11/2006 | Herr et al. |
| 2007/0054777 A1 | 3/2007 | Kawai et al. |
| 2007/0105070 A1 | 5/2007 | Trawick |
| 2007/0123997 A1 | 5/2007 | Herr et al. |
| 2007/0129653 A1 | 6/2007 | Sugar et al. |
| 2008/0156363 A1 | 7/2008 | Ikeuchi et al. |
| 2008/0269027 A1 | 10/2008 | Chen |
| 2008/0271942 A1 | 11/2008 | Yamashita et al. |
| 2008/0281468 A1 | 11/2008 | Jacobsen et al. |
| 2009/0036815 A1 | 2/2009 | Ido |
| 2009/0038258 A1 | 2/2009 | Pivac et al. |
| 2009/0039579 A1 | 2/2009 | Clifford et al. |
| 2009/0199883 A1 | 8/2009 | Hiki |
| 2009/0210093 A1 | 8/2009 | Jacobsen et al. |
| 2009/0294238 A1 | 12/2009 | Gilmore |
| 2010/0050947 A1 | 3/2010 | Kortekaas |
| 2010/0089855 A1 | 4/2010 | Kjolseth |
| 2010/0094185 A1 | 4/2010 | Amundson et al. |
| 2010/0152630 A1 | 6/2010 | Matsuoka et al. |
| 2010/0198402 A1 | 8/2010 | Greer et al. |
| 2010/0241242 A1 | 9/2010 | Herr et al. |
| 2010/0295497 A1 | 11/2010 | Takamatsu |
| 2011/0010012 A1 | 1/2011 | Murayama et al. |
| 2011/0040216 A1 | 2/2011 | Herr et al. |
| 2011/0046781 A1 | 2/2011 | Summer |
| 2011/0066088 A1* | 3/2011 | Little ................... B25J 9/0006 601/35 |
| 2011/0071677 A1 | 3/2011 | Stillman |
| 2011/0219899 A1 | 9/2011 | Dize et al. |
| 2011/0264230 A1 | 10/2011 | Herr et al. |
| 2012/0000891 A1 | 1/2012 | Nakanishi et al. |
| 2012/0060322 A1 | 3/2012 | Simonelli et al. |
| 2012/0065902 A1 | 3/2012 | Nakajima |
| 2012/0073930 A1 | 3/2012 | Lansberry et al. |
| 2012/0137667 A1 | 6/2012 | Jacobsen et al. |
| 2012/0179075 A1 | 7/2012 | Perry et al. |
| 2012/0191245 A1 | 7/2012 | Fudaba et al. |
| 2012/0216671 A1 | 8/2012 | Gammon |
| 2012/0237319 A1 | 9/2012 | Jacobsen et al. |
| 2012/0259429 A1 | 10/2012 | Han et al. |
| 2012/0277901 A1 | 11/2012 | Jacobsen et al. |
| 2012/0277911 A1 | 11/2012 | Jacobsen et al. |
| 2012/0277915 A1 | 11/2012 | Jacobsen et al. |
| 2012/0328395 A1 | 12/2012 | Jacobsen et al. |
| 2013/0011220 A1 | 1/2013 | Jacobsen et al. |
| 2013/0013108 A1 | 1/2013 | Jacobsen et al. |
| 2013/0023803 A1 | 1/2013 | Hsu et al. |
| 2013/0033050 A1 | 2/2013 | Matsuoka et al. |
| 2013/0057001 A1 | 3/2013 | Tsai |
| 2013/0090580 A1 | 4/2013 | Hong et al. |
| 2013/0106127 A1 | 5/2013 | Lipson et al. |
| 2013/0106128 A1 | 5/2013 | Yamasaki et al. |
| 2013/0192406 A1 | 8/2013 | Godowski |
| 2013/0226048 A1 | 8/2013 | Unluhisarcikli et al. |
| 2013/0253385 A1 | 9/2013 | Goffer et al. |
| 2013/0296746 A1 | 11/2013 | Herr et al. |
| 2013/0302129 A1 | 11/2013 | Smith et al. |
| 2013/0331744 A1* | 12/2013 | Kamon ................... A61H 3/00 601/35 |
| 2013/0333368 A1 | 12/2013 | Durfee et al. |
| 2014/0100492 A1 | 4/2014 | Nagasaka |
| 2014/0190289 A1 | 7/2014 | Zhu |
| 2014/0195052 A1 | 7/2014 | Tsusaka et al. |
| 2015/0073595 A1 | 3/2015 | Fudaba et al. |
| 2015/0073596 A1 | 3/2015 | Fudaba et al. |
| 2015/0173929 A1 | 6/2015 | Kazerooni et al. |
| 2015/0209214 A1 | 7/2015 | Herr et al. |
| 2015/0272749 A1 | 10/2015 | Amend, Jr. et al. |
| 2015/0278263 A1 | 10/2015 | Bowles et al. |
| 2015/0321342 A1 | 11/2015 | Smith et al. |
| 2016/0114482 A1 | 4/2016 | Lessing et al. |
| 2016/0153508 A1 | 6/2016 | Battlogg |
| 2016/0331572 A1 | 11/2016 | Popovic et al. |
| 2016/0332302 A1 | 11/2016 | Bingham et al. |
| 2016/0332305 A1 | 11/2016 | Gonzalez et al. |
| 2018/0133905 A1 | 5/2018 | Smith et al. |
| 2018/0133906 A1 | 5/2018 | Smith et al. |
| 2018/0193172 A1 | 7/2018 | Smith et al. |
| 2018/0193999 A1 | 7/2018 | Jacobsen et al. |
| 2018/0194000 A1 | 7/2018 | Smith et al. |
| 2018/0290309 A1 | 10/2018 | Becker et al. |
| 2018/0298976 A1 | 10/2018 | Battlogg |
| 2019/0176320 A1 | 6/2019 | Smith et al. |
| 2019/0184576 A1 | 6/2019 | Smith et al. |
| 2020/0001450 A1 | 1/2020 | Smith et al. |

FOREIGN PATENT DOCUMENTS

| | | |
|---|---|---|
| CN | 203495949 U | 3/2014 |
| CN | 203752160 U | 8/2014 |
| CN | 104843484 A | 8/2015 |
| CN | 105818143 A | 8/2016 |
| CN | 107471203 A | 12/2017 |
| CN | 108081303 A | 5/2018 |
| DE | 102004029513 B3 | 9/2005 |
| DE | 102010029088 A1 | 11/2011 |
| DE | 202013009698 U1 | 11/2013 |
| DE | 102016201540 A1 | 8/2017 |
| EP | 0039578 A1 | 11/1981 |
| EP | 0616275 A3 | 9/1998 |
| EP | 1037264 A2 | 9/2000 |
| EP | 1258324 A2 | 11/2002 |
| EP | 1442846 A1 | 8/2004 |
| EP | 1721593 A1 | 11/2006 |
| EP | 2198810 A1 | 6/2010 |
| EP | 2942162 A2 | 11/2015 |
| EP | 2168548 B1 | 10/2016 |
| FR | 2651220 A1 | 3/1991 |
| GB | 686237 A | 1/1953 |

(56) References Cited

FOREIGN PATENT DOCUMENTS

| | | |
|---|---|---|
| GB | 2278041 A | 11/1994 |
| JP | S34-015764 | 10/1959 |
| JP | S36-005228 | 5/1961 |
| JP | S44-000603 | 1/1969 |
| JP | S50-009803 | 1/1975 |
| JP | S50-006043 | 3/1975 |
| JP | S52-013252 A | 2/1977 |
| JP | S52-134985 A | 11/1977 |
| JP | S56-140510 A | 11/1981 |
| JP | S58-113586 A | 7/1983 |
| JP | S60-177883 U | 11/1985 |
| JP | S62-193784 A | 8/1987 |
| JP | S62-200600 A | 9/1987 |
| JP | H01-295772 A | 11/1989 |
| JP | H02-51083 U | 4/1990 |
| JP | H03-85398 U | 8/1991 |
| JP | H04-44296 U | 4/1992 |
| JP | H05-004177 A | 1/1993 |
| JP | H05-023989 A | 2/1993 |
| JP | H06-213266 A | 8/1994 |
| JP | H07-001366 A | 1/1995 |
| JP | H07-5129 Y2 | 2/1995 |
| JP | H07-060679 A | 3/1995 |
| JP | H07-112377 A | 5/1995 |
| JP | H07-031291 U | 6/1995 |
| JP | H07-246578 A | 9/1995 |
| JP | H08-126984 A | 5/1996 |
| JP | H09-11176 A | 1/1997 |
| JP | H1156931 | 3/1999 |
| JP | H11-130279 A | 5/1999 |
| JP | 2002-161547 A | 6/2002 |
| JP | 2003-103480 A | 4/2003 |
| JP | 2004-105261 A | 4/2004 |
| JP | 2005-118938 A | 5/2005 |
| JP | 2005-237504 A | 9/2005 |
| JP | 2005-334999 A | 12/2005 |
| JP | 2006-016916 A | 1/2006 |
| JP | 2006007337 A | 1/2006 |
| JP | 2006-028953 A | 2/2006 |
| JP | 2006-051558 A | 2/2006 |
| JP | 2006-167223 A | 6/2006 |
| JP | 3909770 B2 | 4/2007 |
| JP | 2007-130234 A | 5/2007 |
| JP | 2007-252514 A | 10/2007 |
| JP | 2007-307216 A | 11/2007 |
| JP | 2008-143449 A | 6/2008 |
| JP | 2009-023828 A | 2/2009 |
| JP | 2009-167673 A | 7/2009 |
| JP | 2009-178253 A | 8/2009 |
| JP | 2009-219650 A | 10/2009 |
| JP | 2009-240488 A | 10/2009 |
| JP | 2009-268839 A | 11/2009 |
| JP | 2010-098130 A | 4/2010 |
| JP | 2010-110381 A | 5/2010 |
| JP | 2010-110465 A | 5/2010 |
| JP | 2010-142351 A | 7/2010 |
| JP | 2011-193899 A | 10/2011 |
| JP | 2012-501739 A | 1/2012 |
| JP | 2012-125279 A | 7/2012 |
| JP | 2013-022091 A | 2/2013 |
| JP | 2013-090693 A | 5/2013 |
| JP | 2013-123786 A | 6/2013 |
| JP | 2013-142445 A | 7/2013 |
| JP | 5267730 | 8/2013 |
| JP | 2013-248699 A | 12/2013 |
| JP | 2014-054273 A | 3/2014 |
| JP | 2014-073222 A | 4/2014 |
| JP | 2014200853 A | 10/2014 |
| JP | 2015112649 A | 6/2015 |
| JP | 2015-212010 A | 11/2015 |
| JP | 2016-539017 A | 12/2016 |
| KR | 2007-0057209 A | 6/2007 |
| KR | 2012-0105194 A | 9/2012 |
| KR | 10-1219795 | 1/2013 |
| KR | 2013-0001409 A | 1/2013 |
| KR | 2013-0045777 A | 5/2013 |
| KR | 2018-0128731 A | 12/2018 |
| WO | WO 2003/002309 A1 | 1/2003 |
| WO | WO 2003/081762 A1 | 10/2003 |
| WO | WO 2007/144629 A2 | 12/2007 |
| WO | WO 2009/143377 A2 | 11/2009 |
| WO | WO 2010/025409 A1 | 3/2010 |
| WO | WO 2010/027968 A2 | 3/2010 |
| WO | WO 2012/042471 A1 | 4/2012 |
| WO | WO 2017/148499 A1 | 9/2017 |
| WO | WO 2017/159504 A1 | 9/2017 |
| WO | WO 2018/118004 A1 | 6/2018 |
| WO | WO 2018/211869 A1 | 11/2018 |
| WO | WO 2018/215705 A1 | 11/2018 |

OTHER PUBLICATIONS

Elliott et al., Design of a Clutch-Spring Knee Exoskeleton for Running, Journal of Medical Devices, Sep. 2014, 11 pages, vol. 8, The American Society of Mechanical Engineers, New York City, NY.

Elliott et al., The Biomechanics and Energetics of Human Running using an Elastic Knee Exoskeleton, Jun. 2013, 7 pages, IEEE International Conference on Rehabilitation Robotics, Seattle, WA.

Hauser et al., JammJoint: A Variable Stiffness Device Based on Granular Jamming for Wearable Joint Support, IEEE Robotics and Automation Letters, Apr. 2017, 7 pages, vol. 2, Issue 2, IEEE, Piscataway, NJ.

Jafari et al., A Novel Actuator with Adjustable Stiffness (AwAS), Oct. 18-22, 6 pages, 2010, IEEE/RSJ International Conference on Intelligent Robots and Systems, Taiwan.

Kulick, An Unpowered Exoskeleton Springs Into Action: Researchers Increase Walking Efficiency, http://www.cmu.edu/me/news/archive/2015/collins-clutch.html, Apr. 1, 2015, 2 pages, Carnegie Mellon University Mechanical Engineering, Pittsburgh, PA.

Miao et al., Mechanical Design of Hybrid Leg Exoskeleton to Augment Load-Carrying for Walking, International Journal of Advanced Robotic Systems, Mar. 28, 2013, 11 pages, vol. 10, Intech open science open minds, Europe.

Mombaur et al., HEiKA-EXO: Optimization-based development and control of an exoskeleton for medical applications, http://typo.iwr.uni-heidelberg.de/groups/orb/research/heika-exo/, Optimization in Robotics & Biomechanics, Oct. 20, 2014, 3 pages, Germany.

Pan, Improved Design of a Three-degree of Freedom Hip Exoskeleton Based on Biomimetic Parallel Structure, Jul. 2011, 132 pages, University of Ontario Institute of Technology, Canada.

Pratt et al., The RoboKnee: An Exoskeleton for Enhancing Strength and Endurance During Walking, International Conference on Robotics & Automation, Apr. 2004, 6 pages, IEEE, New Orleans, LA.

Searchmap Blog, Scientists Develop Mechanical Spring-Loaded Leg Brace to Improve Walking, http://www.searchmap.eu/blog/scientists-develop-mechanical-spring-loaded-leg-brace-to-improve-walking/, Apr. 1, 2015, 5 pages, Searchmap Blog.

Seppala, These exoskeleton heels could help stroke victims walk again, https://www.engadget.com/2015/04/02/feet-exoskeletons/, Apr. 2, 2015, Engadget, San Francisco, CA.

Siddharth et al., Design and Analysis of a 1-DOF Walking Mechanism, http://siddharthswaminathan.in/files/WalkingMechanism.pdf, Nov. 2012, 7 pages, India.

Suitx, Phoenix Medical Exoskeleton, https://suitx.com/phoenix-medical-exoskeleton, 3 pages, to the best of the applicant's knowledge article was available before the application filing dated of May 5, 2015, US Bionics, Inc., Berkeley, CA.

Suleiman, Engineering an affordable exoskeleton, Phys.org, https://phys.org/news/2014-06-exoskeleton.html, Jun. 12, 2014, 5 pages, Science X network.

Vanderborght et al., Variable impedance actuators: A review, Robotics and Autonomous Systems, Dec. 2013, 14 pages, vol. 61, Issue 12, Elsevier, Netherlands.

Walsh, Biomimetic Design of an Under-Actuated Leg Exoskeleton for Load-Carrying Augmentation, Massachusetts Institute of Technology, Feb. 2006, 97 pages, Massachusetts.

(56) References Cited

OTHER PUBLICATIONS

Walsh et al., A Quasi-Passive Leg Exoskeleton for Load-Carrying Augmentation, International Journal of Humanoid Robotics, Mar. 8, 2007, 20 pages, vol. 4, No. 3, World Scientific Publishing Company.
Zubrycki et al., Novel haptic glove-based interface using jamming principle, Proceedings of the 10$^{th}$ International Workshop on Robot Motion and Control, Jul. 6-8, 2015, 6 pages, IEEE, Poland.
EP Search Report for EP Application No. 15166668.2, dated Oct. 19, 2015, 6 pages.
EP Search Report for EP Application No. 15166669.0, dated Dec. 10, 2015, 12 pages.
EP Search Report for EP Application No. 15166667.4, dated Feb. 19, 2016, 11 pages.
EP Search Report for EP Application No. 15166664.1, dated Apr. 15, 2016, 9 pages.
EP Search Report for EP Application No. 17201464.9, dated Apr. 26, 2018, 8 pages.
EP Search Report for EP Application No. 17201467.2, dated Apr. 26, 2018, 7 pages.
EP Search Report for EP Application No. 17201466.4, dated Apr. 30, 2018, 8 pages.
EP Search Report for EP Application No. 18210380.4, dated Mar. 27, 2019, 9 pages.
EP Search Report for EP Application No. 18213196.1, dated Apr. 8, 2019, 11 pages.
Aghili et al., Sensing the torque in a robot's joints, www.memagazine.org/backissues/september98/features/torque.html, 1998, pp. 1-9, The American Society of Mechanical Engineers.
Aliens (Movie), Starring Sigourney Weaver, Directed by James Cameron, Written by James Cameron, David Giler, Walter Hill, Dan O'Bannon, and Ronald Shuset, Released 1985 by Twentieth Century Fox, Scenes at Playtime 88:26:31-00:26:59 & 00:27:40-00:28:05 & 02:08:25-02:10:39 Non-Patent Literature documentation; Aliens(1986)—IMDb; downloaded Sep. 27, 2014; 4 pages; http://www.imdb.com/title/tt10090605/.
Amikabir University of Technology, Manipulator Dynamics (Power Point), Computer Engineering and Information Technology Department, to the best of applicant's knowledge article was available before the application filing date, 44 pages.
Barras, Stabilization of a Biped Robot with its arms—A Practical Approach, http://biorob.epfl.ch/files/content/sites/biorob/filed/users/170220/public/Report.pdf; May 2010, 33 pages, EPFL Biorobotics Laboratory (BioRob), Switzerland.
Bauman, Utah Firm Markets on Big Gorilla of an Arm, Deseret News; Jan. 27, 1993, 2 pages, Deseret News Publishing Company, Salt Lake City, Utah.
Claeyssen et al., Magnetostrictive actuators compared to piezoelectric actuators, Proceedings of SPIE—The International Society for Optical Engineering 4763, Mar. 2003, 6 pages.
Digital World Tokyo, Giant Robot Grabbing Hands Grab All They Can, www.digitalworldtokyo.com/index.php/digital_tokyo/articles/giant_robot_grabbing_hands_grab_all_they_can/, Jul. 17, 2007, 3 pages.
Endo et al., A quasi-passive model of human leg function in level-ground walking, 2006 IEEE/RSJ International Conference on Intelligent Robots and Systems, Oct. 9-15, 2006, pp. 4935-4939, Institute of Electrical and Electronics Engineers, Piscataway, New Jersey.
Gauthier et al., Magnetic Shape Memory Alloy and Actuator Design, Conference: 5th International Workshop on Microfactories (IWMF'06), Oct. 2006, 5 pages, Besançon, France.
Huber et al., The selection of mechanical actuators based on performance indices, Oct. 8, 1997, pp. 2185-2205, vol. 453 Issue 1965, The Royal Society, London.
Hunter et al., Fast Reversible NiTi Fibers for Use in Microrobotics, Proceedings. IEEE Micro Electro Mechanical Systems, Jan. 30-Feb. 2, 1991, pp. 166-170, Institute of Electrical and Electronics Engineers, Piscataway, New Jersey.

Industrial Magnetics, Inc., PowerLift® Magnets; www.magnetics.com/product.asp?ProductID=1; as accessed Nov. 6, 2012, 2 pages; Boyne City, Michigan.
Jacobsen et al., Research Robots for Application in AI, Teleoperation and Entertainment, Proceedings of the International Fluid Power Exposition and Technical Conference, Mar. 24-24, 1992, pp. 1-19, Chicago, Illinois.
Jacobsen et al., Research Robots for Applications in Artificial Intelligence, Teleoperation and Entertainment; The International Journal of Robotics Research; Apr.-May 2004, pp. 319-330, vol. 23, No. 4-5, SAGE Publications, Thousand Oaks, California.
Jacobsen, Science, Robotics, and Superheroes, Presented at Department of Science University of Utah Science at Breakfast, Mar. 17, 2010, 16 pages.
Jansen et al., Exoskeleton for Soldier Enhancement Systems Feasibility Study, Sep. 2000, 44 pages, Oak Ridge National Laboratory, Oak Ridge, Tennessee.
Kazerooni, Berkeley Lower Extremity Exoskeleton (BLEEX), to the best of applicant's knowledge article was available before the application filing date, 3 pages, University of California, Berkeley, Berkeley, California.
Kim, Development of a small 6-axis force/moment sensor for robot's fingers, Measurement Science and Technology, Sep. 30, 2004, 2 pages, Issue 11, Institute of Physics and IOP Publishing Limited.
Kim et al, A Force Reflected Exoskeleton-Type Masterarm for Human-Robot Interaction, IEEE Transactions on Systems, Man and Cybertentics—Part A: Systems and Humans, Mar. 2005, pp. 198-212, vol. 35, No. 2, Institute of Electrical and Electronics Engineers, Piscataway, New Jersey.
Laliberte et al., Underactuation in Space Robotic Hands, Proceeding of the 6th International Symposium on Artificial Intelligence and Robotics & Automation in Space, Jun. 18-22, 2001, 8 pages, Canadian Space Agency, Canada.
Magnetic Base, www.ask.com/wiki/magnetic_base; page last updated Sep. 12, 2012, 2 pages, retrieved from www.ask.com/wiki/magnetic_base.
Mirfakhrai et al., Polymer artificial muscles, materialstoday, Apr. 2007, pp. 30-38, vol. 10 No. 4, Elsevier, Netherlands.
Moosavian et al., Dynamics Modeling and Tip-Over Stability of Suspended Wheeled Mobile Robots with Multiple Arms, 2007 IEEE/RSJ International Conference on Intelligent Robots and Systems, Oct. 29-Nov. 2, 2007; pp. 1210-1215, Institute of Electrical and Electronics Engineers, Piscataway, New Jersey.
Newport Corporation, Heavy-Duty Magnetic Base, 300 lb (1334 N) Holding Force, ¼20 Thread, http://search.newport.com/?q=*&x2=sku&q2=200, as accessed Apr. 23, 2011, 1 page, Irvine, CA.
Oak Ridge National Laboratory, Foot Force-Torque Sensor Novel Sensor for Measuring Forces and Torques at the Foot, www.ornl.gov, to the best of applicant's knowledge article was available before the application filing date, 1 page, Oak Ridge National Laboratory, Oak Ridge, Tennessee.
Omega, Load Cell Designs, www.omega.com/literature/transactions/volume3/load3,html, Nov. 1, 2005, 3 pages.
Ostling, Wearable Robots, Technology Review, Jul./Aug. 2004, pp. 70-73, Elizabeth Bramson-Boudreau, Cambridge, Massachusetts.
Pelrine et al., Electrostriction of polymer dielectrics with compliant electrodes as a means of actuation, Sensors and Actuators A: Physical, Jan. 1998, pp. 77-85, vol. 64 Issue 1, Elsevier, Netherlands.
Pelrine et al., High-field deformation of elastomeric dielectrics for actuators, Materials Science and Engineering, Nov. 28, 2000, pp. 89-100, vol. 11 Issue 2, Elsevier, Netherlands.
Pelrine et al., Dielectric Elastomer Artificial Muscle Actuators: Toward Biomimetic Motion, Proceedings of SPIE—The International Society for Optical Engineering, Jul. 2002, pp. 126-137, vol. 4695, SPIE, Bellingham, WA.
Pin, Wearable Robotics Presented to New Horizons in Science Briefing, Oct. 2003, 34 pages, Knoxville, Tennessee.
Robotics Research Group, Degrees of Freedom, www.robotics.utexas.edu/rrg/learn_more/low_ed/dof/, Oct. 25, 2006, 2 pages, University of Texas.

(56) References Cited

OTHER PUBLICATIONS

Rouse et al., Clutchable Series-Elastic Actuator: Design of a Robotic Knee Prosthesis for Minimum Energy Consumption, 2013 IEEE 13th International Conference on Rehabilitation Robotics (ICORR), Jun. 24-26, 2013, 6 pages, Institute of Electrical and Electronics Engineers, Piscataway, New Jersey.
Schuler et al., Dextrous Robot Arm, In Proceedings of the $8^{th}$ ESA Workshop on Advanced Space Technologies for Robotic and Automation 'ASTRA 2004' ESTEC, Nov. 2-4, 2004, 8 pages, Noordwijk, The Netherlands.
Shamaei et al., Estimation of Quasi-Stiffness of the Human Knee in the Stance Phase of Walking, Mar. 22, 2013, 10 pages, vol. 8 Issue 3. PLOS One, San Francisco, California.
Smith et al., Integrated thin-film piezoelectric traveling wave ultrasonic motors, Sensors and Actuators A: Physical, Dec. 2012, pp. 305-311, vol. 188, Elsevier, Netherlands.
Song et al, Kinematics Analysis and Implementation of a Motion-Following Task for a Humanoid Slave Robot Controlled by an Exoskeleton Master Robot, International Journal of Control, Automation and Systems, Dec. 2007, pp. 681-690, vol. 5, No. 6, Korean Institute of Electrical Engineers, South Korea.
Tmsuk, Rescue Robot "T-53" release Control Technologies to Control the Synchronous Operation of the Arm, http://robot.watch.impress.co.jp/cda/news/2007/07/18/564.html, as accessed Sep. 1, 2011 5 pages, Robot Watch website.
Ueda et al., Large Effective-Strain Piezoelectric Actuators Using Nested Cellular Architecture With Exponential Strain Amplification Mechanisms, IEEE/ASME Transactions on Mechatronics, Oct. 2010, pp. 770-782, vol. 15 Issue 5, Institute of Electrical and Electronics Engineers, Piscataway, New Jersey.
Wang et al., A highly-underactuated robotic hand with force and joint angle sensors, 2011 IEEE/RSJ International Conference on Intelligent Robots and Systems, Sep. 25-30, 2011, 6 pages, Institute of Electrical and Electronics Engineers, Piscataway, New Jersey.
Yeates, Utah-built robot safeguards the workplace, http://www.ksl.com?nid=148&sid=17654421&autostart=y, Oct. 13, 2011, 3 pages, KSL Broadcasting, Salt Lake City, Utah.
Yip et al., High-Performance Robotic Muscles from Conductive Nylon Sewing Thread, 2015 IEEE International Conference on Robotics and Automation (ICRA), May 26-30, 2015, 6 pages, Seattle, Washington.
International Search Report for International Application No. PCT/US2019/069001 dated Apr. 30, 2020, 18 pages.
International Search Report for International Application No. PCT/US2019/068998 dated May 20, 2020, 15 pages.
International Search Report for International Application No. PCT/US2019/069004 dated Apr. 1, 2020, 15 pages.

\* cited by examiner

LEGGED ROBOTIC DEVICE UTILIZING MODIFIABLE LINKAGE MECHANISM

RELATED APPLICATION

This application claims the benefit of U.S. Provisional Application No. 61/989,513, filed May 6, 2014, which is incorporated by reference in its entirety herein.

BACKGROUND

A wide variety of exoskeleton, humanoid, and other legged robot systems exist. The fundamental technical problem to be solved for such systems, where energetic autonomy is concerned, is power. Two options are available: use a high-output power supply that can meet the demands of the robotic system, or use less power. The first option lacks practicality, inasmuch as portable power remains a challenge, which leaves the second option. Accordingly, the exoskeletons or ambulatory robots currently in existence are not capable of providing high force outputs for prolonged periods of time. In other words, the power issue has been a challenging obstacle, with the typical solution being to reduce the force output capabilities of the system.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In order to improve an exoskeleton, humanoid, or other legged robot system's force output and endurance capabilities with limited power available, the efficiency of such systems can be the focus of improvement. Accordingly, a legged robotic device is disclosed that improves efficiency over a typical robotic system. In one aspect, in an embodiment employing actuators associated with one or more degrees of freedom, the number of actuators recruited can vary as needed to meet the needs of a given command scenario. In another aspect, a single actuator can be used to actuate a single degree of freedom to carry out a gait-like motion by the device that emulates a human gait. The legged robotic device can include a mechanism formed at least in part by a plurality of support members coupled together for relative movement defining a plurality of degrees of freedom, at least some of the plurality of degrees of freedom corresponding to degrees of freedom of a human leg. The legged robotic device can also include a primary drive actuator operable to apply a force or a torque to the support members in a first of the plurality of degrees of freedom. In addition, the legged robotic device can include a second actuator operable to apply a force or a torque to the support members in a second of the plurality of degrees of freedom. The mechanism can be configured to move in a gait-like motion that emulates human gait. The primary drive actuator can be sufficient to actuate the mechanism to move the mechanism in the gait-like motion. The mechanism can be dynamically modified by actuating the second actuator.

In one aspect, a legged robotic device is disclosed that can include a mechanism formed at least in part by a plurality of support members coupled together for relative movement defining a plurality of degrees of freedom. At least some of the plurality of degrees of freedom can correspond to degrees of freedom of a human leg. The legged robotic device can also include a primary drive actuator operable to apply a force or a torque to the support members in a first of the plurality of degrees of freedom corresponding to a hip flexion/extension degree of freedom of the human leg. Additionally, the legged robotic device can include a second actuator operable to apply a force or a torque to the support members in a second of the plurality of degrees of freedom corresponding to a knee flexion/extension degree of freedom of the human leg. The mechanism can be configured to move in a gait-like motion that emulates human gait. The primary drive actuator can be sufficient to actuate the mechanism to move the mechanism in the gait-like motion. The mechanism can be dynamically modified by actuating the second actuator.

In yet another aspect, a lower body exoskeleton is disclosed that can include a base member configured to be located about and secured to a user. The lower body exoskeleton can also include a dynamically tunable gait emulating legged robotic device supported about the base member. The legged robotic device can include a mechanism formed at least in part by a plurality of support members coupled together for relative movement defining a plurality of degrees of freedom. At least some of the plurality of degrees of freedom can correspond to degrees of freedom of a human leg. The legged robotic device can also include a primary drive actuator operable to apply a force or a torque to the support members in a first of the plurality of degrees of freedom. In addition, the legged robotic device can include a second actuator operable to apply a force or a torque to the support members in a second of the plurality of degrees of freedom. The mechanism can be configured to move in a gait-like motion that emulates human gait. The primary drive actuator can be sufficient to actuate the mechanism to move the mechanism in the gait-like motion. The mechanism can be dynamically modified by actuating the second actuator.

Figure 1:
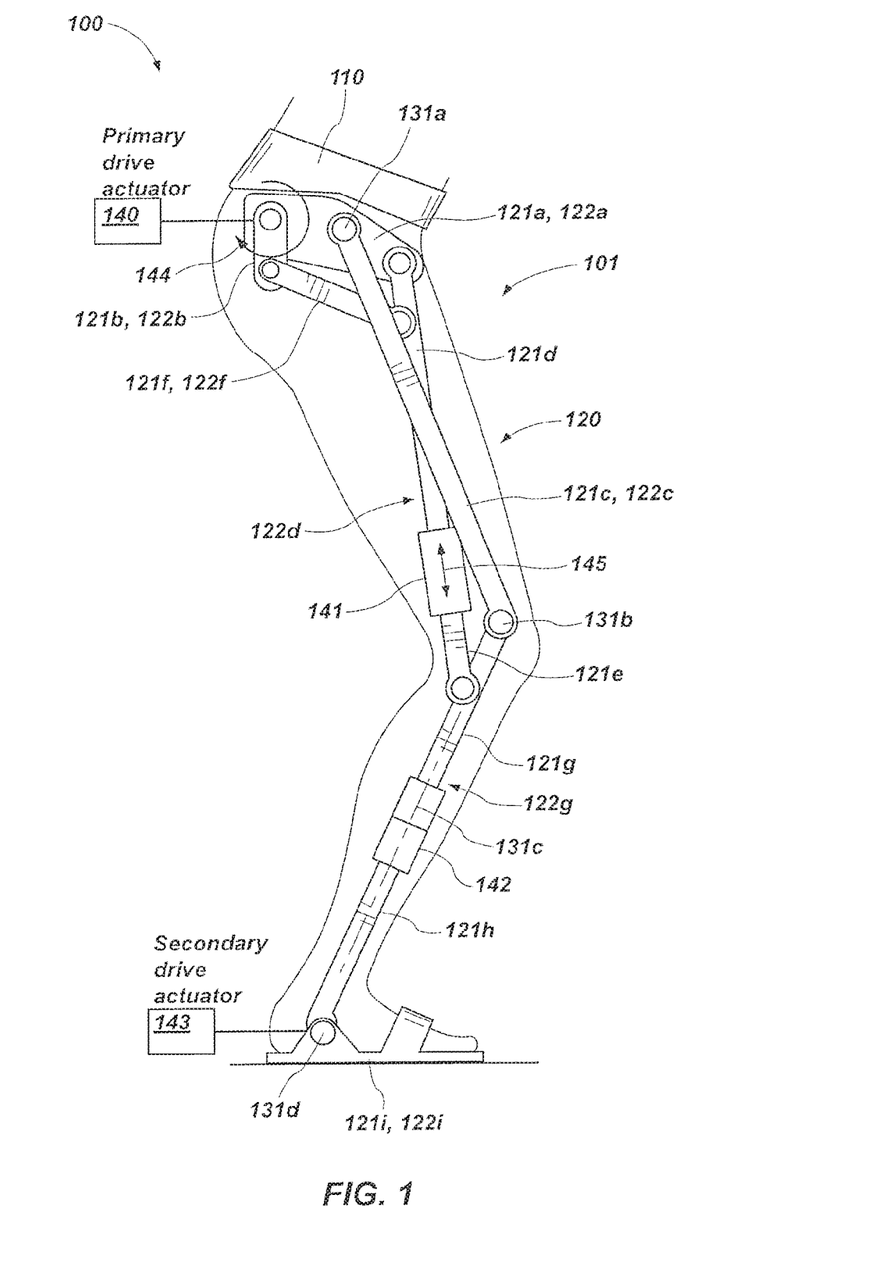
FIG. 1 is an illustration of a lower body exoskeleton in accordance with an example of the present disclosure.

One embodiment of a lower body exoskeleton 100 is illustrated in FIG. 1. The lower body exoskeleton 100 can comprise a base member 110 configured to be located about and secured to a user. The lower body exoskeleton 100 can also include a dynamically tunable gait emulating legged robotic device 101 supported about the base member 110. The coupling of the base member 110 and the legged robotic device 101 can include one or more degrees of freedom (not shown) corresponding to a hip of a human leg, such as hip adduction/abduction and/or hip medial/lateral rotation. The legged robotic device 101 can include a mechanism 120 formed at least in part by a plurality of support members 121a-i coupled together for relative movement defining a plurality of degrees of freedom. The legged robotic device 101 can also include a primary drive actuator 140, and one or more secondary actuators 141-143, which are discussed in greater detail below, to actuate the lower body exoskeleton 100 in the various degrees of freedom that correspond to degrees of freedom of a human leg.

A human user or operator may use or interact with the legged robotic device 101 by placing his or her feet into a foot portion of the device, where the feet of the operator can be in contact with a corresponding force sensor. Portions of the human operator can also be in contact with force sensors disposed on various locations of the legged robotic device 101. For example, a hip portion of the legged robotic device 101 can have a force sensor configured to interact with the operator's hip. The operator can be coupled to the legged robotic device 101 by a waist strap or other appropriate coupling device. The operator can be further coupled to the legged robotic device 101 by a foot strap or other appropriate coupling device. In one aspect, a force sensor can be located about a knee portion of the legged robotic device 101 near a knee of the operator. While reference is made to force sensors disposed at specific locations on or about the legged robotic device 101, it should be understood that force sensors can be strategically placed at numerous locations on or about the legged robotic device 101 in order to facilitate proper operation of the legged robotic device 101.

One or more of the support members 121a-i can be included in a single linkage of the mechanism 120. In the example illustrated, the support members 121a, 121b, 121c, 121f, 121i can each form linkages 122a, 122b, 122c, 122f, 122i, respectively, of the mechanism 120. On the other hand, the support members 121d, 121e and the secondary actuator 141 can be included in a single linkage 122d of the mechanism 120, and the support members 121g, 121h and the secondary actuator 142 can be included in a single linkage 122g of the mechanism 120. In one aspect, the support member 121a can form a ground linkage or a frame serving as a fixed reference for the mechanism. Although reference is made herein to specific examples of mechanisms, it should be recognized that any suitable mechanism in any suitable configuration may be utilized in accordance with the principles disclosed herein. For example, any mechanism may be utilized in which at least some of the plurality of degrees of freedom correspond to degrees of freedom of a human leg, such that the mechanism is configured to move in a gait-like motion that emulates human gait (e.g., walking, running, etc.). In other words, any mechanism can be utilized in which linkages can be tailored to generate an operator specific cyclic gait pattern. With reference to the example illustrated in FIG. 1, for instance, the degree of freedom formed by the coupling of the support member 121c to the support member 121a for rotation about an axis 131a can correspond to a hip flexion/extension degree of freedom. The degree of freedom formed by the coupling of the support member 121c to the support member 121g for rotation about an axis 131b can correspond to a knee flexion/extension degree of freedom. The degree of freedom formed by the coupling of the support member 121g to the support member 121h for rotation about an axis 131c can correspond to an ankle medial/lateral rotation degree of freedom. The degree of freedom formed by the coupling of the support member 121h to the support member 121i for rotation about an axis 131d can correspond to an ankle flexion/extension degree of freedom. In some mechanism configurations, a virtual axis of rotation that varies in location throughout movement of the mechanism may correspond to a degree of freedom of a human leg.

In one aspect, one or more of the support members 121a-i can be utilized to apply a force and/or a moment to the support members of the mechanism 120 (i.e., an input linkage). For example, the primary drive actuator 140 can be operable to apply a force or a torque to the support members 121a-l in a degree of freedom defined by the coupling of the support members. In the example illustrated, the primary drive actuator 140 can apply a force or torque to the support member 121b (i.e., in direction 144), which can serve as an input linkage, to cause the mechanism 120 to move. In one aspect, the primary drive actuator 140 can cause the support members 121a-i to move in a degree of freedom corresponding to hip flexion/extension (i.e., about the axis 131a), although it should be recognized that a primary drive actuator can be configured to cause the support members 121a-i to move in a degree of freedom corresponding to knee flexion/extension (i.e., about the axis 131b) or ankle flexion/extension (i.e., about the axis 131d) when causing the mechanism 120 to move.

As shown in FIGS. 2A-2F, which illustrates the legged robotic device 101 with the mechanism 120 in various positions of a full revolution of the input support member 121b, the primary actuator 140 can be sufficient to actuate the mechanism to move the mechanism in a gait-like motion corresponding to human gait. In other words, the secondary actuators 141, 142 are inactive or locked in these figures such that the linkages 122d, 122g, respectively, are unchanged, thus maintaining a configuration of the mechanism 120 throughout the gait cycle. In one aspect, illustrated in FIGS. 2A-2F, an end 123 of the mechanism 120 can move in a trajectory that emulates movement of a human foot during gait. The support member 121i has been omitted for clarity, although this support member may be included at the terminal end 123 of the mechanism 120. The primary actuator 140 can therefore cause the support member 121b to rotate continuously and the mechanism 120 can be maintained in a configuration such that the end 123 of the mechanism 120 follows a prescribed trajectory emulating a human gait, such as a walking or a running gait. In one aspect, movement of the legged robotic device 101 corresponding to major degrees freedom of the human leg, such as hip flexion/extension and knee flexion/extension, can be coupled by using the mechanism 120, which can be constrained to follow a prescribed trajectory, such as a walking gait cycle, when driven by the primary drive actuator 140.

Figures 2A, 2B:
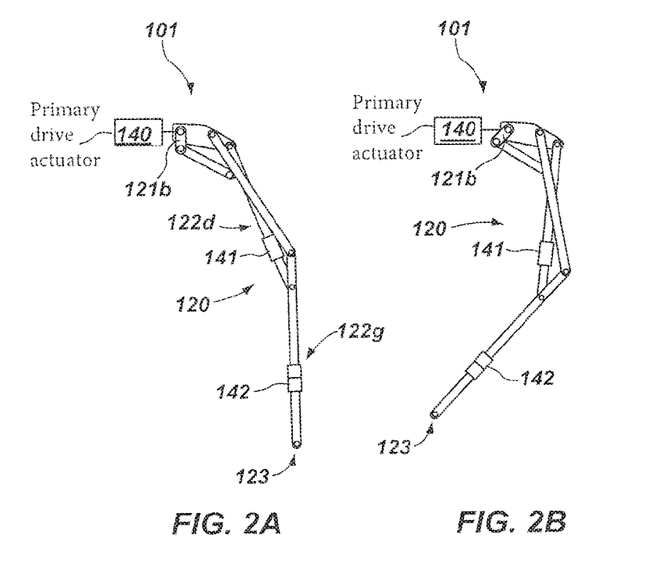
FIGS. 2A-2F illustrate a legged robotic device of the lower body exoskeleton of FIG. 1 with a mechanism of the legged robotic device in various positions emulating a human gait, in accordance with an example of the present disclosure.
Figure 2C:
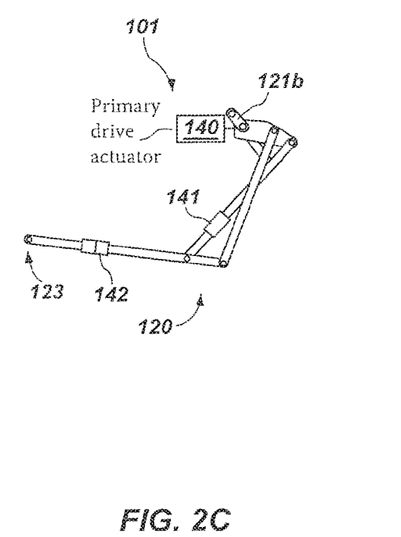
Figure 2D:
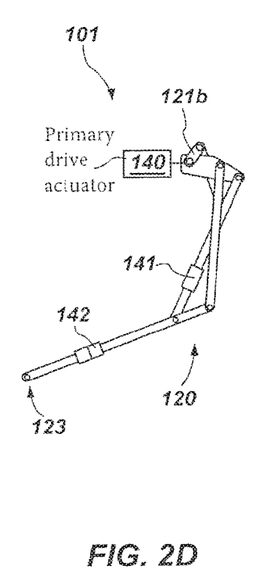
Figures 2E, 2F:
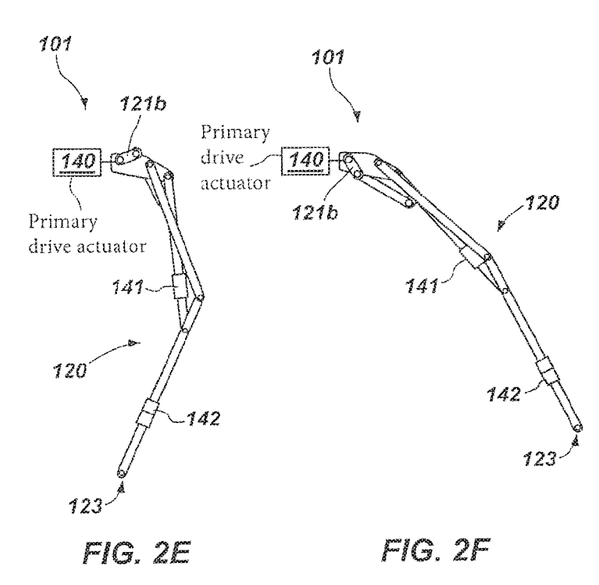

With continued reference to FIGS. 1-2F, the secondary actuators 141-143 can be recruited as desired to dynamically change or modify the mechanism 120 and the cyclic gait parameters (e.g., stride length), as well as to allow the legged robotic device 101 to perform non-gait motion, such as climbing stairs and inclines, maneuvering on rough terrain, squatting, or other movements and activities. For example, the secondary actuator 141 can be operable to apply a force or a torque to the support members 121a-i in a degree of freedom defined by the coupling of the support members. In the example illustrated, the secondary actuator 141 can apply a force to the support members 121d, 121e, which can cause the support members 121d, 121e to move in direction 145 relative to one another. In other words, the secondary actuator 141 can be configured to vary an axial distance between two coaxial support members 121d, 121e, thus dynamically modifying the linkage 122d (i.e., varying a length of the linkage 122d) and thereby dynamically modifying the mechanism 120. In this manner, the mechanism 120 can be dynamically modified by actuating the secondary actuator 141. The secondary actuator 142 can also be operable to apply a force or a torque to the support members 121a-i in a degree of freedom defined by the coupling of the support members. As illustrated, the secondary actuator 142 can apply a torque to the support members 121g, 121h, which can cause the support members 121g, 121h to rotate about an axis 131c relative to one another. In other words, the secondary actuator 142 can be configured to vary a relative rotational orientation between two coaxial support members 121g, 121h, thus dynamically modifying the linkage 122g and thereby dynamically modifying the mechanism 120. In this manner, the mechanism 120 can be dynamically modified by actuating the secondary actuator 142.

In one aspect, the mechanism 120 can be dynamically modified to tune the gait-like motion of the mechanism in response to a change in gait. In other words, the mechanism 120 can be tuned in real-time to adapt to the gait characteristics of its user. For example, a length of the linkage 122d can be increased or decreased to accommodate a change in stride length of a user or to modify the mechanism 120 to transition with the user from a walking gait to a running gait. Thus, the secondary actuator 141 can be actuated "on the fly," while the primary drive actuator 140 is actively causing movement of the mechanism 120, to dynamically vary or modify the mechanism in response to a change in the user's gait.

In another aspect, the mechanism 120 can be dynamically modified to facilitate a non-gait motion, such as squatting, lunging, kneeling, crouching, ascending/descending a stair, ascending/descending a ladder, ascending/descending an incline, changing direction, stumble recovery, and/or any other representative movement performed by humans. For example, the secondary actuator 141 can be actuated to cause the support members 121a-i to move in a degree of freedom corresponding to knee flexion/extension (i.e., about the axis 131b), such as by varying a length of the linkage 122d of the mechanism 120 as described above. In another example, the secondary actuator 142 can be actuated to cause the support members 121a-i to move in a degree of freedom corresponding to ankle medial/lateral rotation (i.e., about the axis 131c), such as by varying a relative rotational orientation between two coaxial support members 121g, 121h of the linkage 122g of the mechanism 120 as described above. Furthermore, the secondary actuator 143 can be actuated to cause the support members 121a-i to move in a degree of freedom corresponding to ankle flexion/extension (i.e., about the axis 131d), such as by varying a relative rotational orientation between the support members 121h, 121i of the mechanism 120. Thus, non-gait motions, such as those that include knee bending or ankle rotation, can be accomplished by actuating a secondary actuator 141-143 alone or in conjunction or combination with any other actuator, such as the primary actuator 140 and/or another secondary actuator, wherein modification of the mechanism 120 is caused to occur.

It should be recognized that any linkage of any mechanism can include a secondary actuator, which can be utilized to modify the mechanism in any desired manner for any desired purpose. In one aspect, the secondary actuators 141-143 can be powered (i.e., utilizing a motor, pump, etc.) or passive (i.e., utilizing a spring, clutch, damper, etc.). When powered, the actuators 140-143 can comprise any suitable type of actuator, such as a hydraulic actuator, a pneumatic actuator, and/or an electric actuator.

Thus, as described above, the present disclosure sets forth a legged robotic device configured for efficient recruitment of various actuators utilized within the robotic device to modify a mechanism from one configuration to another changed configuration, wherein one of which purposes is to save energy. Generally speaking, the actuators of the legged robotic device are in line with linkage elements within the legged robotic device such that linkage elements can be modified to create leg motions consistent with walking and other non-walking motions (squatting, climbing, running, etc.). The linkages can be reconfigured or modified dynamically by selectively recruiting and actuating an actuator, whereas when emulating gait-like motion and actuated by only the primary drive actuator, the linkages act as rigid members. However, upon recruitment of different actuators in accordance with the principles taught herein, the rigidity or the rigidity properties of the linkages can be modified and reconfigured.

The dynamic recruitment of various actuators allows the legged robotic device to save energy. When the robotic device is standing or walking, both can be accomplished with a single actuatable degree of freedom in the multi-linkage mechanism. Thus, the mechanism can have a primary drive actuator that can cause the mechanism to move through a human gait. Typically, one such mechanism is used for each leg. The primary drive actuator can be employed when walking or standing. The legged robotic device may be configured to comprise additional or other actuators and degrees of freedom to facilitate other motions, such as going up stairs, crouching, etc. These other non-gait motions can be accommodated or achieved by dynamically recruiting other (secondary) actuators and degrees of freedom of the mechanism that were previously inactive (not actuated), which actuators were not needed for the walking motion. As such, energy is conserved as the secondary actuators are not in use when not needed. In other words, only the actuators that are needed are powered at any given time (e.g., only powering the primary drive actuator when walking or standing). Thus, when walking or standing not all of the actuators of the device are in use, so the energy usage is kept to a minimum as only one degree of freedom per leg is being powered. However, when the user begins to do other motions, such as climbing stairs, one or more additional secondary actuators and degrees of freedom can be actuated that form part of the mechanism and can serve to modify the mechanism to facilitate performance of other motions. In other words, a structural part of the leg that was otherwise inactive can be activated (i.e., other structural parts of the mechanism can turn on) to perform a desired function, which activation can be performed in real time in response to given operating conditions. The combined motions of the normally-inactive or off secondary actuators are such that the human operator can move normally while doing the needed range of non-walking and non-standing motions.

Recruitment of the secondary actuators can be based on the load sensed by the system by using any suitable type of sensor. In one aspect, a control system can be included that senses when the operator desires to accomplish a motion other than walking or standing. Thus, the control system can activate the normally-inactive or off secondary actuators and direct the secondary actuators to provide the commanded motion for the duration commanded by the operator, after which the control system can return the secondary actuators to the inactive or off condition.

In one exemplary operational scenario, the legged robotic device can operate at a low level for walking and standing, thus allowing the energy consumption of the robotic device to be at a minimum as only one degree of freedom is being actuated. By using a reduced set of actuators (e.g., one actuator per leg) in conjunction with a suitable mechanism, such as those described herein and shown in the drawings, overall system efficiency can be increased. It is noted that an actuator can be configured to operate in more than one degree of freedom, and that the present disclosure should not be limited to operational scenarios where a single actuator always controls a single degree of freedom. Energy requirements will naturally increase as additional secondary actuators and associated degrees of freedom are recruited. However, using such additional secondary actuators can provide additional functionality that is unavailable to the operator when only walking or standing using a single actuated degree of freedom.

By recruiting actuators operable with the mechanism (e.g., embedded in-line within a linkage) as needed, the robotic device can be configured such that the actuators can be strategically activated and inactivated or turned on and off as needed as opposed to having all of the actuators on at all times to perform any of the available functions, as in prior robotic systems. Indeed, with many traditional robotic structural and actuation arrangements, all the degrees of freedom are in continuous use because the robots are not set up to where one degree of freedom can be used to perform basic (although sometimes complex) motions. Therefore, these prior systems require the use of all actuators to do a walking motion because that is the way the robot is configured. In contrast, in accordance with a legged robotic device of the present disclosure, a mechanism can be configured such that human gait, such as walking, can be carried out by the mechanism in a gait-like manner that the emulates the way a human would move using a single actuator, thus eliminating the need to use all of the actuators of the robotic device at all times. The secondary actuators can be recruited to modify the mechanism in response to changes in gait or to perform non-gait functions. In other words, the secondary actuators can be recruited as needed when the user is not walking or standing. Thus, the secondary actuators may only become active when needed to perform non-walking or non-standing functions. Inasmuch as most of the time is spent walking or standing, the energy savings using this approach could be very significant.

Accordingly, the mechanism can include secondary actuators that can be made active or turned on to modify the mechanism or made inactive or turned off to fix or set a linkage of the mechanism in a given configuration once the mechanism is suitable for the current operating scenario (i.e., standing or walking with a stride length that approximates that of the user's). Thus, the secondary actuators can be selectively actuated, as desired, which can save energy. For example, with a hydraulic actuator, when the actuator is not needed then fluid can remain on both sides of a piston such that the actuator remains fixed or locked and functions as a rigid member. Thus, when not actuated, the actuator acts like a rigid element of the linkage. However, when needed, the actuator can be selectively actuated to displace, thereby modifying or changing the mechanism and causing the mechanism to produce a different motion. In other words, using the actuator as a brake and a structural element provides an available degree of freedom when needed that can act as a rigid member when not needed.

Figure 3:
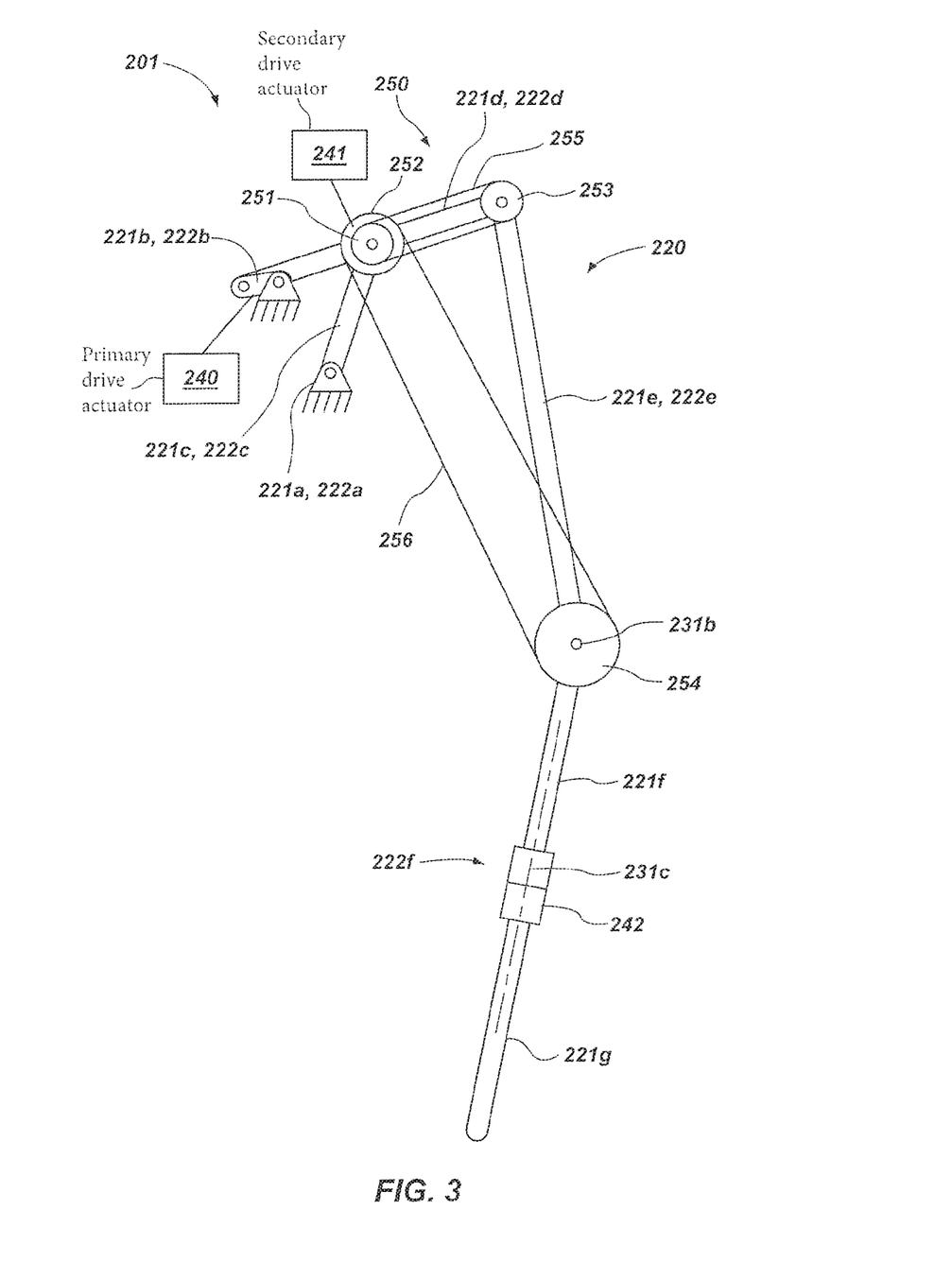
FIG. 3 is an illustration of a lower body exoskeleton in accordance with another example of the present disclosure.

FIG. 3 illustrates a dynamically tunable gait emulating legged robotic device 201 in accordance with another example of the present disclosure. The legged robotic device 201 is similar in many respects to the legged robotic device 101 described above. For example, the legged robotic device 201 can include a mechanism 220 formed at least in part by a plurality of support members 221a-g coupled together for relative movement defining a plurality of degrees of freedom. The legged robotic device 201 can also include a primary drive actuator 240, and one or more secondary actuators 241, 242.

One or more of the support members 221a-g can be included in a single linkage of the mechanism 220. In the example illustrated, the support members 221a-e can each form linkages 222a-e, respectively, of the mechanism 220. On the other hand, the support members 221f, 221g and the secondary actuator 242 can be included in a single linkage 122f of the mechanism 220. In one aspect, the support member 221a can represent a ground linkage or a frame serving as a fixed reference for the mechanism 220. At least some of the plurality of degrees of freedom of the mechanism 220 can correspond to degrees of freedom of a human leg, such that the mechanism 220 is configured to move in a gait-like motion that emulates human gait. For example, the degree of freedom formed by the coupling of the support member 221e to the support member 221f for rotation about an axis 231b can correspond to a knee flexion/extension degree of freedom. The degree of freedom formed by the coupling of the support member 221f to the support member 221g for rotation about an axis 231c can correspond to an ankle medial/lateral rotation degree of freedom. In this case, a virtual axis of rotation that varies in location throughout movement of the mechanism 220 may correspond to a hip flexion/extension degree of freedom of a human leg.

One or more of the support members 221a-g can be utilized to apply a force and/or a moment to the support members of the mechanism 220 (i.e., an input linkage). For example, the primary drive actuator 240 can be operable to apply a force or a torque to the support members 221a-g in a degree of freedom defined by the coupling of the support members. In the example illustrated, the primary drive actuator 240 can apply a force or torque to the support member 221b, which can serve as an input linkage, causing the support member 221b to rotate about a pivot coupling with the support member 221a (i.e., the ground or reference linkage), to cause the mechanism 220 to move.

In one aspect, the mechanism 220 can comprise a synchronous drive system 250 to transmit torque and provide a synchronous motion sequence for two or more of the plurality of support members 221a-g. For example, the support member 221*c* can be rotatably coupled to the support member 221*d* at a mid-portion of the support member 221*d*. The support member 221*e* can be rotatably coupled to the support member 221*d*, such as at an end portion of the support member 221*d*. The support member 221*f* can be rotatably coupled to the support member 221*e*, such as at an end portion of the support member 221*e*. A gear or pulley 251, 252 can be coupled to the support member 221*c* for rotation relative to the support member 221*d*. A gear or pulley 253 can be coupled to the support member 221*e* for rotation relative to the support member 221*d*. A gear or pulley 254 can be coupled to the support member 221*f* for rotation relative to the support member 221*e*. A belt or a chain 255 can couple the gears or pulleys 251, 253 to one another. A belt or a chain 256 can couple the gears or pulleys 252, 254 to one another. Thus, as the primary drive actuator 240 causes the support member 221*b* to rotate, the support member 221*c* rotates relative to the support member 221*d*. This causes the gear or pulley 251 to rotate the gear or pulley 253, thereby causing the support member 221*e* to rotate relative to the support member 221*d*. Similarly, rotation of the support member 221*c* relative to the support member 221*d* causes the gear or pulley 252 to rotate the gear or pulley 254, thereby causing the support member 221*f* to rotate relative to the support member 221*e*. Thus, actuating the primary drive actuator 240 can be sufficient to cause movement of the mechanism 220 that emulates human gait, without any actuation or input from the secondary actuators 241, 242.

In one aspect, the mechanism 220 can be dynamically modified to tune the gait-like motion of the mechanism in response to a change in gait or to facilitate a non-gait motion. For example, the secondary actuator 241 can be configured to rotate the gears or pulleys 251, 252 independent of one another and the support members 221*c*, 221*d*, such that the support members 221*e*, 221*f* can be moved relative to the other support members 221*a-d*, which can modify the mechanism 220. The secondary actuator 241, which can comprise one actuator for the gear or pulley 251 and another for the gear or pulley 252, can cause the gears or pulleys 251, 252 to rotate relative to one another and/or the support members 221*c*, 221*d*, as another example of the how the mechanism 220 can be modified. The secondary actuator 242 can be actuated to modify the mechanism 220 in a similar manner as discussed above with regard to the mechanism 120. Thus, tuning of gait-like motion and non-gait motions, such as those that include knee bending or ankle rotation, can be accomplished by actuating a secondary actuator 241, 242 alone or in conjunction or combination with any other actuator, such as the primary actuator 140 and/or the other secondary actuator, to modify the mechanism 220.

The gears or pulleys 251-254 can be configured to achieve any suitable synchronous movement for the associated support members. Any suitable chain, belt, gear train, etc. may be used. In one aspect, a timing chain or a timing belt may be used. As mentioned above, any suitable mechanism can be utilized in accordance with the principles disclosed herein, as the present disclosure can incorporate any suitable mechanism that is conceivable by one skilled in the art.

In accordance with one embodiment of the present invention, a method for facilitating emulation of lower body movements of an operator is disclosed. The method can comprise providing a legged robotic device having a mechanism formed at least in part by a plurality of support members coupled together for relative movement defining a plurality of degrees of freedom, at least some of the plurality of degrees of freedom corresponding to degrees of freedom of a human leg, a primary drive actuator operable to apply a force or a torque to the support members in a first of the plurality of degrees of freedom, and a second actuator operable to apply a force or a torque to the support members in a second of the plurality of degrees of freedom, wherein the mechanism is configured to move in a gait-like motion that emulates human gait, wherein the primary drive actuator is sufficient to actuate the mechanism to move the mechanism in the gait-like motion. Additionally, the method can comprise facilitating a dynamic modification of the mechanism. In one aspect of the method, facilitating a dynamic modification of the mechanism can comprise actuating at least one of the primary drive actuator and the second actuator. It is noted that no specific order is required in this method, though generally in one embodiment, these method steps can be carried out sequentially.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A legged robotic device, comprising:
  a mechanism formed at least in part by a plurality of support members coupled together for relative movement defining a plurality of degrees of freedom, at least some of the plurality of degrees of freedom corresponding to degrees of freedom of elements of a human leg, wherein the mechanism is configured to move in a gait-like motion that emulates human gait;
  a primary drive actuator operable to apply a force or a torque to the support members in a first degree of freedom of the plurality of degrees of freedom; and
  a secondary actuator operable to apply a force or a torque to the support members in a second degree of freedom of the plurality of degrees of freedom,
  wherein, with the secondary actuator inactive, the primary drive actuator is operable to provide sufficient force to actuate the mechanism to move the mechanism in the gait-like motion, and
  wherein the secondary actuator is operable to be selectively activated in real-time during operation of the legged robotic device to dynamically modify the mechanism in response to a given operator command scenario to facilitate at least one of tuning of the gait-like motion or the performance of a non-gait motion, and
  wherein the mechanism is dynamically modifiable to tune the gait-like motion of the mechanism in response to a change in stride length.

2. The legged robotic device of claim 1, wherein the gait is a walking gait or a running gait.

3. The legged robotic device of claim 1, wherein an end of the mechanism moves in a trajectory that emulates movement of a human foot during gait.

4. The legged robotic device of claim 1, wherein the mechanism is dynamically modified to facilitate the non-gait motion.

5. The legged robotic device of claim 1, wherein the non-gait motion comprises squatting, kneeling, crouching, ascending/descending a stair, ascending/descending a ladder, ascending/descending an incline, or a combination thereof.

6. The legged robotic device of claim 1, wherein the secondary actuator is actuated to vary a length of a linkage of the mechanism to facilitate the non-gait motion.

7. The legged robotic device of claim 1, wherein the secondary actuator is actuated to move at least one of the plurality of support members to facilitate the non-gait motion.

8. The legged robotic device of claim 1, wherein the mechanism is dynamically modified by actuating only the secondary actuator.

9. The legged robotic device of claim 1, wherein the mechanism is dynamically modified by actuating the primary actuator in conjunction with the secondary actuator.

10. The legged robotic device of claim 1, wherein the mechanism comprises a plurality of linkages formed at least in part by the plurality of support members.

11. The legged robotic device of claim 10, wherein at least one of the plurality of linkages comprises at least one of the plurality of support members and the secondary actuator.

12. The legged robotic device of claim 11, wherein the secondary actuator is configured to vary an axial distance between two coaxial support members.

13. The legged robotic device of claim 11, wherein the secondary actuator is configured to vary a relative rotational orientation between two coaxial support members.

14. The legged robotic device of claim 1, wherein the mechanism comprises a robotic joint synchronous drive system to transmit torque and provide a synchronous motion sequence for two or more of the plurality of support members via actuation of the primary drive actuator.

15. The legged robotic device of claim 14, wherein the synchronous drive system comprises at least one of a gear, a belt, and a chain.

16. The legged robotic device of claim 1, wherein the first of the plurality of degrees of freedom corresponds to one of a hip flexion/extension degree of freedom, a knee flexion/extension degree of freedom, and an ankle flexion/extension degree of freedom.

17. The legged robotic device of claim 1, wherein the elements of the human leg comprises at least one of a hip or an ankle or a knee, or combinations thereof.

18. The legged robotic device of claim 1, wherein the secondary actuator is one of a plurality of secondary actuators of the legged robotic device, each secondary actuator operable to apply at least one of a force or a torque to the support members in a respective degree of freedom of the plurality of degrees of freedom, wherein at least one of the plurality of secondary actuators is recruitable to be selectively activated in real-time during operation of the legged robotic device to dynamically modify the mechanism in response to an operator command scenario.

19. A legged robotic device, comprising:
  a mechanism comprising a plurality of linkages formed at least in part by a plurality of support members coupled together for relative movement defining a plurality of degrees of freedom, at least some of the plurality of degrees of freedom corresponding to degrees of freedom of elements of a human leg, wherein the mechanism is configured to move in a gait-like motion that emulates human gait;
  a primary drive actuator operable to apply a force or a torque to the support members in a first degree of freedom of the plurality of degrees of freedom corresponding to a hip flexion/extension degree of freedom of the respective element of the human leg; and
  a secondary actuator operable to apply a force or a torque to the support members in a second degree of freedom of the plurality of degrees of freedom corresponding to a knee flexion/extension degree of freedom of the respective element of the human leg, wherein at least one of the plurality of linkages comprises at least one of the plurality of support members and the secondary actuator,
  wherein, with the secondary actuator inactive, the primary drive actuator is operable to provide sufficient force to actuate the mechanism to move the mechanism in the gait-like motion,
  wherein the secondary actuator is operable to be selectively activated in real-time during operation of the legged robotic device to dynamically modify the mechanism in response to a given operator command scenario to facilitate at least one of tuning of the gait-like motion or the performance of a non-gait motion, and
  wherein the secondary actuator is configured to vary at least one of an axial distance between two coaxial support members or a relative rotational orientation between two coaxial support members.

20. The legged robotic device of claim 19, wherein an end of the mechanism moves in a trajectory that emulates movement of a human foot during gait.

21. The legged robotic device of claim 19, wherein the elements of the human leg comprises at least two of a hip or an ankle or a knee.

22. A lower body exoskeleton, comprising:
a base member configured to be located about and secured to a user; and
a dynamically tunable gait emulating legged robotic device supported about the base member, comprising:
a mechanism comprising a plurality of linkages formed at least in part by a plurality of support members coupled together for relative movement defining a plurality of degrees of freedom, at least some of the plurality of degrees of freedom corresponding to degrees of freedom of elements of a human leg, wherein the mechanism is configured to move in a gait-like motion that emulates human gait,
a primary drive actuator operable to apply a force or a torque to the support members in a first degree of freedom of at least some of the plurality of degrees of freedom, and
a secondary actuator operable to apply a force or a torque to the support members in a second degree of freedom of at least some of the plurality of degrees of freedom, wherein at least one of the plurality of linkages comprises at least one of the plurality of support members and the secondary actuator,
wherein, with the secondary actuator inactive, the primary drive actuator is operable to provide sufficient force to actuate the mechanism to move the mechanism in the gait-like motion,
wherein the secondary actuator is operable to be selectively activated in real-time during operation of the legged robotic device to dynamically modify the mechanism in response to a given operator command scenario to facilitate at least one of tuning of the gait-like motion or the performance of a non-gait motion, and
wherein the secondary actuator is configured to vary at least one of an axial distance between two coaxial support members or a relative rotational orientation between two coaxial support members.

23. The lower body exoskeleton of claim 22, wherein the elements of the human leg comprises at least two of a hip or an ankle or a knee, or combinations thereof.

24. A method for facilitating emulation of lower body movements of an operator, the method comprising:
providing a legged robotic device having
a mechanism comprising a plurality of linkages formed at least in part by a plurality of support members coupled together for relative movement defining a plurality of degrees of freedom, at least some of the plurality of degrees of freedom corresponding to degrees of freedom of elements of a human leg,
a primary drive actuator operable to apply a force or a torque to the support members in a first degree of freedom of at least some of the plurality of degrees of freedom, and
a secondary actuator operable to apply a force or a torque to the support members in a second degree of freedom of at least some of the plurality of degrees of freedom, wherein at least one of the plurality of linkages comprises at least one of the plurality of support members and the secondary actuator
wherein the mechanism is configured to move in a gait-like motion that emulates human gait,
wherein, with the secondary actuator inactive, the primary drive actuator is operable to provide sufficient force to actuate the mechanism to move the mechanism in the gait-like motion; and
facilitating selective activation of the secondary actuator in real-time during operation of the legged robotic device to dynamically modify the mechanism in response to a given operator command scenario, wherein the secondary actuator is configured to vary at least one of an axial distance between two coaxial support members or a relative rotational orientation between two coaxial support members.

25. The method of claim 24, wherein facilitating a dynamic modification of the mechanism comprises actuating at least one of the primary drive actuator and the secondary actuator.

26. The method of claim 24, wherein the elements of the human leg comprises at least two of a hip or an ankle or a knee, or combinations thereof.

27. The method of claim 24, wherein the secondary actuator is one of a plurality of secondary actuators of the legged robotic device, and the method further comprises facilitating recruitment of at least one secondary actuator of the plurality of secondary actuators of the legged robotic device to dynamically modify the mechanism in response to a given operator command scenario.

28. A legged robotic device, comprising:
a mechanism formed at least in part by a plurality of support members coupled together for relative movement defining a plurality of degrees of freedom, at least some of the plurality of degrees of freedom corresponding to degrees of freedom of a elements of a human leg, wherein the mechanism is configured to move in a gait-like motion that emulates human gait;
a primary drive actuator operable to apply a force or a torque to the support members in a first degree of freedom of the plurality of degrees of freedom; and
a plurality of secondary actuators each operable to apply a force or a torque to the support members in a second degree of freedom of the plurality of degrees of freedom,
wherein at least one of the plurality of secondary actuators is recruitable and operable to be selectively activated to dynamically modify the mechanism, and
wherein a first secondary actuator of the plurality of secondary actuators is operable to apply a force to the support members to be moved in a degree of freedom corresponding to ankle flexion/extension, and wherein a second secondary actuator of the plurality of secondary actuators is operable to apply a force to the support members to be moved in a degree of freedom corresponding to knee flexion/extension, and wherein a third secondary actuator of the plurality of secondary actuators is operable to apply a force to the support members to vary a relative rotational orientation between two coaxial support members situated between an ankle joint and a knee joint of the legged robotic device.

29. The legged robotic device of claim 28, wherein the at least one of the plurality of secondary actuators is recruitable by a control system in real-time during operation of the legged robotic device in response to a given operator command sensed by the control system.

30. A legged robotic device, comprising:
a mechanism formed at least in part by a plurality of support members coupled together for relative movement defining a plurality of degrees of freedom, at least some of the plurality of degrees of freedom corresponding to degrees of freedom of elements of a human leg, wherein the mechanism is configured to move in a gait-like motion that emulates human gait;

a primary drive actuator operable to apply a force or a torque to the support members in a first degree of freedom of the plurality of degrees of freedom; and a secondary actuator operable to apply a force or a torque to the support members in a second degree of freedom of the plurality of degrees of freedom, wherein, with the secondary actuator inactive, the primary drive actuator is operable to provide sufficient force to actuate the mechanism to move the mechanism in the gait-like motion, and wherein the secondary actuator is operable to be selectively activated in real-time during operation of the legged robotic device to dynamically modify the mechanism in response to a given operator command scenario to facilitate at least one of tuning of the gait-like motion or the performance of a non-gait motion, and wherein the secondary actuator is actuated to vary a length of a linkage of the mechanism to facilitate the non-gait motion.

31. A legged robotic device, comprising:

a mechanism formed at least in part by a plurality of support members coupled together for relative movement defining a plurality of degrees of freedom, at least some of the plurality of degrees of freedom corresponding to degrees of freedom of elements of a human leg, wherein the mechanism is configured to move in a gait-like motion that emulates human gait;

a primary drive actuator operable to apply a force or a torque to the support members in a first degree of freedom of the plurality of degrees of freedom; and a secondary actuator operable to apply a force or a torque to the support members in a second degree of freedom of the plurality of degrees of freedom, wherein, with the secondary actuator inactive, the primary drive actuator is operable to provide sufficient force to actuate the mechanism to move the mechanism in the gait-like motion, and wherein the secondary actuator is operable to be selectively activated in real-time during operation of the legged robotic device to dynamically modify the mechanism in response to a given operator command scenario to facilitate at least one of tuning of the gait-like motion or the performance of a non-gait motion, and wherein the mechanism is dynamically modified by actuating only the secondary actuator.

32. A legged robotic device, comprising:

a mechanism comprising a plurality of linkages formed at least in part by a plurality of support members coupled together for relative movement defining a plurality of degrees of freedom, at least some of the plurality of degrees of freedom corresponding to degrees of freedom of elements of a human leg, wherein the mechanism is configured to move in a gait-like motion that emulates human gait;

a primary drive actuator operable to apply a force or a torque to the support members in a first degree of freedom of the plurality of degrees of freedom; and a secondary actuator operable to apply a force or a torque to the support members in a second degree of freedom of the plurality of degrees of freedom, wherein at least one of the plurality of linkages comprises at least one of the plurality of support members and the secondary actuator, wherein, with the secondary actuator inactive, the primary drive actuator is operable to provide sufficient force to actuate the mechanism to move the mechanism in the gait-like motion, wherein the secondary actuator is operable to be selectively activated in real-time during operation of the legged robotic device to dynamically modify the mechanism in response to a given operator command scenario to facilitate at least one of tuning of the gait-like motion or the performance of a non-gait motion, and wherein the secondary actuator is configured to vary an axial distance between two coaxial support members.

33. A legged robotic device, comprising:

a mechanism comprising a plurality of linkages formed at least in part by a plurality of support members coupled together for relative movement defining a plurality of degrees of freedom, at least some of the plurality of degrees of freedom corresponding to degrees of freedom of elements of a human leg, wherein the mechanism is configured to move in a gait-like motion that emulates human gait;

a primary drive actuator operable to apply a force or a torque to the support members in a first degree of freedom of the plurality of degrees of freedom; and a secondary actuator operable to apply a force or a torque to the support members in a second degree of freedom of the plurality of degrees of freedom, wherein at least one of the plurality of linkages comprises at least one of the plurality of support members and the secondary actuator, wherein, with the secondary actuator inactive, the primary drive actuator is operable to provide sufficient force to actuate the mechanism to move the mechanism in the gait-like motion, wherein the secondary actuator is operable to be selectively activated in real-time during operation of the legged robotic device to dynamically modify the mechanism in response to a given operator command scenario to facilitate at least one of tuning of the gait-like motion or the performance of a non-gait motion, and wherein the secondary actuator is configured to vary a relative rotational orientation between two coaxial support members.

* * * * *